US012698849B2

(12) United States Patent
Krauss et al.

(10) Patent No.: US 12,698,849 B2
(45) Date of Patent: Aug. 4, 2026

(54) HIGH-PRESSURE FLUID LINE

(71) Applicant: Fränkische Industrial Pipes GMBH & CO. KG, Königsberg (DE)

(72) Inventors: Manfred Krauss, Hettstadt (DE); Daniel Spielberg, Nuremberg (DE); Dominik Blümmert, Konigsberg in Bayern (DE); Mike Jurischka, Schweinfurt (DE); Sören Schröter, Hallstadt (DE)

(73) Assignee: Fränkische Industrial Pipes GMBH & CO. KG, Königsberg (DE)

( * ) Notice: Subject to any disclaimer, the term of this patent is extended or adjusted under 35 U.S.C. 154(b) by 590 days.

(21) Appl. No.: 18/035,392

(22) PCT Filed: Nov. 2, 2021

(86) PCT No.: PCT/EP2021/080343
§ 371 (c)(1),
(2) Date: May 4, 2023

(87) PCT Pub. No.: WO2022/096437
PCT Pub. Date: May 12, 2022

(65) Prior Publication Data
US 2023/0407998 A1      Dec. 21, 2023

(30) Foreign Application Priority Data
Nov. 4, 2020     (DE) ..................... 10 2020 129 048.9

(51) Int. Cl.
F16L 11/112          (2006.01)
(52) U.S. Cl.
CPC .................................. F16L 11/112 (2013.01)
(58) Field of Classification Search
CPC ..................................................... F16L 11/112
(Continued)

(56) References Cited

U.S. PATENT DOCUMENTS 3,275,038 A * 9/1966 Roberts .................. F16L 11/112
                                                          138/122
3,857,415 A * 12/1974 Morin .................... F16L 11/115
                                                          138/125
(Continued)

FOREIGN PATENT DOCUMENTS

DE       202006017190 U1      3/2008
DE       102013200579 A1      7/2014
(Continued)

OTHER PUBLICATIONS

German Application No. 102020129048.9, "Search Report", Jun. 21, 2021, 9 pages.
(Continued)

*Primary Examiner* — David R Deal
(74) *Attorney, Agent, or Firm* — Kilpatrick Townsend & Stockton LLP

(57)          ABSTRACT

A high-pressure fluid line including a corrugated tube defining a fluid flow channel its interior, wherein a wall of the corrugated tube, in parallel with the extension direction of the fluid flow channel, comprises a sequence of wave peaks and wave troughs. The fluid line includes a braiding made of threads, which is applied to an outer periphery of the corrugated tube. The braiding bears tightly against the outer periphery of the corrugated tube at a substantially constant braiding angle over the entire corrugated tube. The braiding and the corrugated tube are connected at least at two mutually separate locations such that stretching of the corrugated tube in a longitudinal direction is accompanied by a reduction in a diameter of the braiding.

18 Claims, 2 Drawing Sheets

(58) Field of Classification Search
USPC ........................................................ 138/121
See application file for complete search history.

(56) References Cited

U.S. PATENT DOCUMENTS

| | | | | | |
|---|---|---|---|---|---|
| 5,638,869 | A | * | 6/1997 | Zaborszki | ............... F16L 33/00 |
| | | | | | 228/136 |
| 5,803,128 | A | * | 9/1998 | Reed | ....................... F16L 33/26 |
| | | | | | 72/367.1 |
| 5,813,438 | A | * | 9/1998 | Reed | ....................... F16L 33/26 |
| | | | | | 285/227 |
| 6,220,023 | B1 | * | 4/2001 | Ezzeddini | .......... F01N 13/1816 |
| | | | | | 60/272 |
| 6,354,332 | B1 | * | 3/2002 | Burkhardt | ............. F16L 27/111 |
| | | | | | 138/131 |
| 6,619,331 | B1 | * | 9/2003 | Suchdev | ................. F01P 11/04 |
| | | | | | 138/121 |
| 6,983,769 | B2 | | 1/2006 | Arima et al. | |
| 7,556,065 | B2 | | 7/2009 | Koizumi | |
| 8,491,649 | B2 | * | 7/2013 | Mach | ....................... D04C 1/06 |
| | | | | | 138/121 |
| 2004/0256018 | A1 | | 12/2004 | Ikemoto et al. | |
| 2007/0261781 | A1 | * | 11/2007 | Mahin | ................... F16L 11/112 |
| | | | | | 428/36.1 |
| 2020/0025319 | A1 | | 1/2020 | Meyer | |
| 2025/0207695 | A1 | * | 6/2025 | Zhang | .................. F16L 11/122 |

FOREIGN PATENT DOCUMENTS

| | | |
|---|---|---|
| EP | 1927803 B1 | 1/2011 |
| GB | 1283216 A | 7/1972 |

OTHER PUBLICATIONS

International Application No. PCT/EP2021/080343, "International Search Report and Written Opinion", Feb. 7, 2022, 17 pages.

* cited by examiner

HIGH-PRESSURE FLUID LINE

CROSS REFERENCE TO RELATED APPLICATION

This application is a U.S. national phase of International Patent Application No. PCT/EP2021/080343 filed on Nov. 2, 2021, which claims priority to German Patent Application No. 10 2020 129 048.9, filed in Germany on Nov. 4, 2020. The entire contents of the above-referenced applications are hereby incorporated herein by reference.

TECHNICAL FIELD

The present invention relates to a high-pressure fluid line, which comprises a corrugated tube, which defines in its interior a fluid flow channel, and the wall of which, in parallel with the extension direction of the fluid flow channel, comprises a sequence of wave peaks and wave troughs.

BACKGROUND

It is generally known in corrugated tubes that, at an increasing internal pressure, initially the length, and then the diameter, of the corrugated tubes increases. For this reason, corrugated tubes are often unsuitable for being used as high-pressure fluid line.

SUMMARY

Therefore, the object of the present invention is to provide a high-pressure fluid line comprising a corrugated tube which in particular has improved properties suitable for use in the transport of fluids under high pressure.

This object is achieved by a high-pressure fluid line, comprising a corrugated tube which defines a fluid flow channel in its interior and the wall of which, in parallel with the extension direction of the fluid flow channel, comprises a sequence of wave peaks and wave troughs, and a braiding made of threads which is applied to an outer periphery of the corrugated tube, wherein the mesh bears tightly against the outer periphery of the corrugated tube, wherein the braiding has a substantially constant braiding angle over the entire corrugated tube, wherein the braiding and the corrugated tube are connected to one another at least at two mutually separate locations, in particular in the region of the two longitudinal ends of the corrugated tube, such that stretching of the corrugated tube in the longitudinal direction is accompanied by a reduction in diameter of the braiding.

Alternatively, the object is achieved according to the invention by a high-pressure fluid line, comprising a corrugated tube which defines a fluid flow channel in its interior and the wall of which, in parallel with the extension direction of the fluid flow channel, comprises a sequence of wave peaks and wave troughs, and a braiding made of threads which is applied to an outer periphery of the corrugated tube, wherein the mesh bears tightly against the outer periphery of the corrugated tube, wherein the braiding has a substantially constant braiding angle over the entire corrugated tube, wherein the braiding has a smaller mesh size in the region of wave troughs than in the region of wave peaks, wherein the high-pressure fluid line is designed such that stretching of the corrugated tube in the longitudinal direction is accompanied by a reduction in diameter of the braiding.

The two alternatives can be regarded equally as an achievement, according to the invention, of the object. In other words, the features that the braiding and the corrugated tube are connected to one another at least at two mutually separate locations, in particular in the region of the two longitudinal ends of the corrugated tube, and that the braiding has a smaller mesh size than in the region of wave peaks than in the region of wave troughs do not have to, but of course may, be realized together in a fluid line according to the invention.

It should be noted at this juncture that the difference in size between a mesh of the braiding which is arranged in the region of a wave peak of the fluid line, and a mesh which is arranged in the region of a wave trough, can be directed by the difference between the corrugated tube periphery between the wave peak and wave trough, that is to say can change proportionally to an outer diameter change of the fluid line from a wave peak to a wave trough. A mesh size in the region of a wave trough can be in particular between 60% and 85%, preferably between 70% and 75%, of a mesh size in the region of a wave peak.

The longitudinal direction is to be understood here as a direction extending in parallel with the extension direction of the fluid flow channel.

As mentioned at the outset, the corrugated tube tends to increase in length upon a rising internal pressure, but, in the case of the fluid line according to the invention, the braiding surrounding the corrugated tube is also stretched and contracts in the manner of a scissor mechanism with respect to its diameter. This reduction in diameter on the one hand counteracts the pressure of the fluid from the side of the fluid flow channel of the corrugated tube and, on the other hand, the material from which the corrugated tube is produced offers a resistance to the diameter reduction of the braiding.

The contraction of the braid results in a force equilibrium being established, in that the corrugated tube can no longer extend if it can no longer be reduced in diameter, and in that the corrugated tube can no longer expand radially if it cannot also be shortened at the same time.

Due to this force equilibrium, high-pressure fluid lines according to the invention can be provided, which can withstand a multiple of the internal pressure of conventional corrugated tubes. Thus, pressures of up to 100 bar were achieved in experiments carried out using high-pressure fluid lines according to the invention. Since, at such high pressures, the connecting pieces attached to a high-pressure fluid line according to the invention represent the limiting factor, an actual load upper limit of the high-pressure fluid lines according to the invention could itself not be achieved in the experiments.

A mesh of the braiding is to be understood as a region which is formed between mutually adjacent and/or intersecting threads of the braiding. In particular, this region is free of threads extending therethrough. For example, such a mesh can be of substantially diamond-shaped design, that is to say delimited by four threads, which form two pairs of two threads each extending in parallel with one another, wherein the threads of one pair intersect the threads of the other pair.

With respect to the second alternative mentioned above, in which the braiding has a smaller mesh size in the region of wave troughs than in the region of wave peaks, a smaller mesh size can also be associated with a smaller outer diameter of the braiding, such that the braiding has a larger diameter in a region adjacent, radially to the outside, to a respective wave peak than in a region which is adjacent, radially to the outside, to a respective wave trough.

In particular, the braiding angle can be in the range of 30° to 60°, in particular approximately 45°. As a result, a force equilibrium between diameter and length changes can be set in a desired manner.

Furthermore, the braiding can comprise a first group of threads and a second group of threads, wherein the first group of threads and the second group of threads extend around the corrugated tube in opposite winding directions. In particular, the threads of a respective group extend substantially in parallel with one another.

Advantageously, a respective thread can be designed as a monofilament and/or as a multifilament. In the case of monofilaments, this can have the advantage that the structure, and thus the load-dependent properties of a thread, are clearly defined. Multifilaments can bear very flat on the corrugated tube. A mixture of monofilaments and multifilaments can lead to the advantages mentioned being combined, wherein it is possible both for a single respective thread to comprise a monofilament of a first material and multifilaments of a second material, and for there to be threads, in addition to threads which are formed purely as a monofilament, which are formed as multifilaments.

A respective thread can comprise polyethylene terephthalate and/or aramid. By providing threads consisting of/comprising polyethylene terephthalate and/or aramid, the load-dependent properties of a thread can be further improved. In particular for the use of aramid threads, it can likewise be conceivable to use the multifilament threads. Multifilament threads can enable a larger coverage of the corrugated tube and/or a smaller mesh width between the threads.

In particular, a respective thread can have a modulus of elasticity of at least 3 kN/mm$^2$, in particular of at least 4.5 kN/mm$^2$. So that the braiding can withstand a change in diameter and length in a desired manner, it can be advantageous to select a high modulus of elasticity for the threads of the braiding. However, it may also be necessary to take into account that the threads nevertheless have a certain elasticity in order to prevent breakage of the threads when the high-pressure fluid line is used.

In a development of the present invention, the high-pressure fluid line can further comprise an outer protective layer which is arranged on the outer side of the corrugated tube, wherein it is possible for the outer protective layer to in particular comprise silicone. The outer protective layer can have various protective properties, such as abrasion protection and/or fire protection for the braiding. Furthermore, the outer protective layer can ensure that the threads are held in place, and thus prevent the threads from being pushed, for example in the case of pressure loading of the fluid line, from a respective wave peak. The outer protective layer can in particular be flexible or even resilient, such that the outer protective layer can follow a bending of the high-pressure fluid line without being damaged. Multifilament threads can also enable improved adhesion of the outer protective layer due to the larger surface area of the threads, compared with monofilaments.

In particular, the outer protective layer can connect the braiding to the corrugated tube at least in portions. Especially in relation to the second alternative of the present invention, according to which the braiding has a smaller mesh size in the region of wave troughs than in the region of wave peaks, the outer protective layer can hold or even fix the braiding in the region of the wave troughs. The outer protective layer can also connect the braiding completely to the corrugated tube.

In this case, the braiding can be embedded in the outer protective layer. That is to say that the threads of the braiding can be in contact with the outer protective layer substantially over their entire surface area. A contact region of the threads of the braiding for contact with other threads or with the corrugated tube can be excluded from this.

The braiding can be arranged on the corrugated tube substantially following the wave peaks and wave troughs. Although this feature is of course applicable to both alternatives of the present invention, this can be realized in particular in the second alternative of the present invention in that the braiding has a smaller mesh size in the region of wave troughs than in the region of wave peaks.

Furthermore, a profile of the corrugated tube can have a substantially sinusoidal course. Due to the continuous, sinusoidal course of the wall of the corrugated tube, a pressure load can be distributed uniformly over the corrugated tube. The sinusoidal course of the corrugated tube can have the further advantage that the individual threads are bent considerably less than, for example, in the case of a trapezoidal profile. This can be very advantageous in particular in combination with multifilament aramid threads which are rather brittle.

The corrugated tube can be made of a thermoplastic material, in particular of polyamide.

For example, a wall of the corrugated tube can have a multilayered structure which in particular comprises two layers. Thus, the corrugated tube can have a radially inner and a radially outer layer. In particular, the two layers can have different properties with respect to impact resistance, chemical resistance, elasticity or the like. One of the two layers mentioned above or a further layer can in particular be designed as a barrier layer. A barrier layer can be produced, for example, from ethylene-vinyl alcohol copolymer (EVOH).

A further aspect of the present invention relates to a pipe arrangement for high-pressure applications, comprising a high-pressure fluid line according to the invention and a connector in each case, in particular a press connector, at the two ends of the high-pressure fluid line, wherein the connectors are in each case designed to fix the multilayered structure of the high-pressure fluid line, which comprises at least the corrugated tube and the braiding, to one another in a force-fitting and/or form-fitting manner.

BRIEF DESCRIPTION OF THE DRAWINGS

The present invention will be described in greater detail below on the basis of an embodiment, with reference to the accompanying drawings. In the drawings.

DETAILED DESCRIPTION

Figure 1:
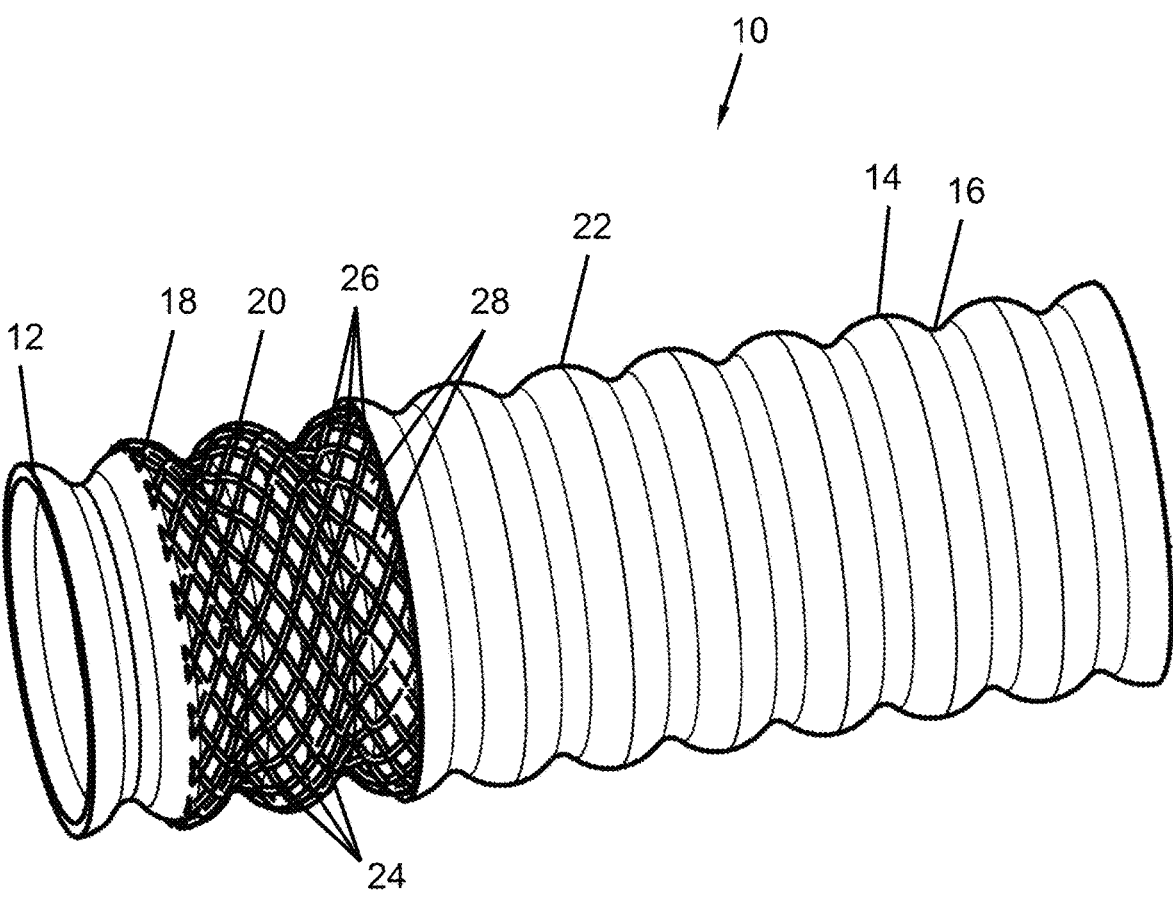
FIG. 1 is a perspective view of an embodiment of a fluid line according to the invention.

A fluid line according to the invention is generally denoted by reference sign 10 in FIG. 1. The fluid line 10 comprises a corrugated tube 12, the wall of which has a sequence of wave peaks 14 and wave troughs 16 (see also FIG. 2).

A braiding 18, which comprises a plurality of threads 20, is arranged on the outer side of the corrugated tube 12. In the embodiment shown here, the braiding 18 is arranged on the outer side of the corrugated tube 12 such that it follows the course of the wave peaks 14 and the wave troughs 16, in close contact therewith. Alternatively, it is also conceivable for the braiding 18 to bear against the wave peaks 14 of the corrugated tube 12, but to be at a predetermined distance from the wall of the corrugated tube 12 in the region of the wave troughs 16. In one conceivable embodiment, the braiding 18 can also extend substantially straight from a wave peak 14 to an adjacent wave peak 14, i.e. the overall structure of the braiding 18 (irrespective of the individual threads 20) can connect a wave peak 14 to an adjacent wave peak 14 in a very short distance.

Figure 2:
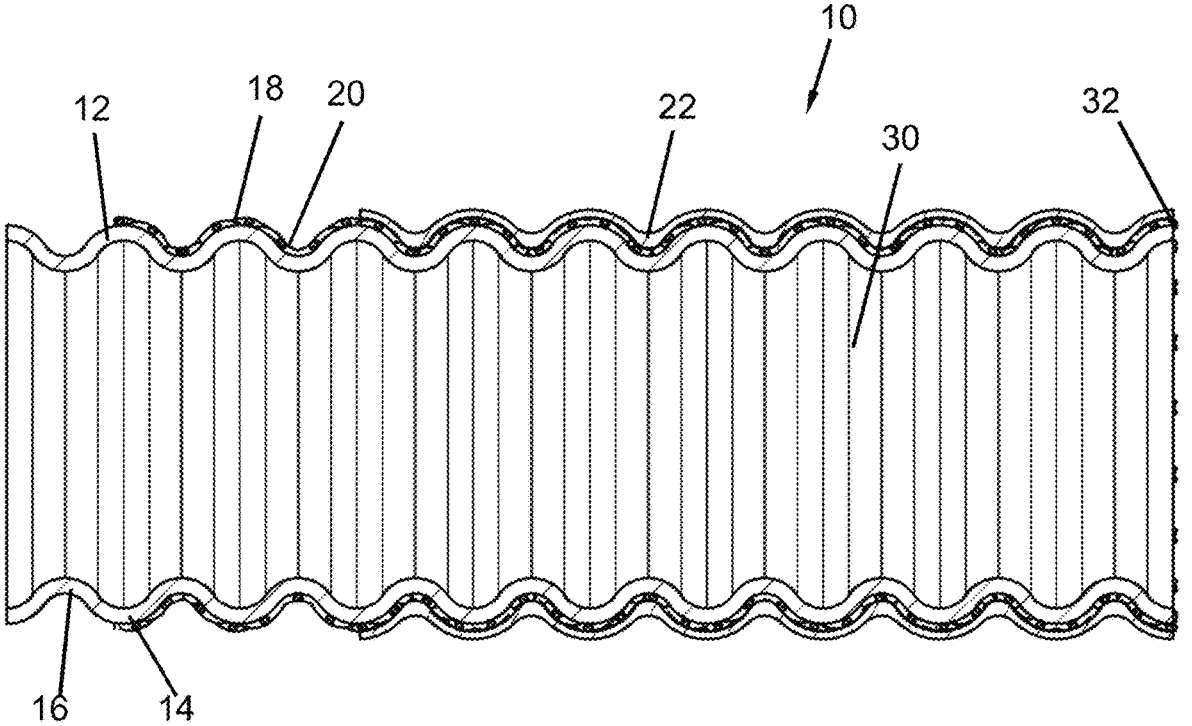
FIG. 2 is a cross-sectional side view of the fluid line according to the invention from FIG. 1.

It can also be seen In FIG. 2 that the fluid line 10 comprises an outer protective layer 22, which is arranged on an outer side of the braiding 18. The outer protective layer 22 can be formed, for example, from a silicone which is applied to the braiding 18 that surrounds the corrugated tube 12. In particular, in this case the outer protective layer 22 can connect to the threads 20 of the braiding 18 such that the threads 18 are embedded in the outer protective layer 22, at least in part.

At the left-hand end of the fluid line 10 shown in FIG. 2, the individual layers of the fluid line 10, specifically the wall of the corrugated tube 12, the braiding 18 and the outer protective layer 22, end at a certain distance from one another, in order to illustrate the structure of the fluid line 10 according to the invention. Advantageously, the layers can, of course, end together at one end of the fluid line 10, as shown in FIG. 2 at the right-hand end of the fluid line 10.

With reference to FIG. 1, it can be seen that a first group 24 of threads 20 extends around the corrugated tube 12 in a first direction of rotation (for example from bottom right to top left in FIG. 1), and that a second group 26 of threads 20 extends around the corrugated tube 12 in a second direction of rotation (for example from top right to bottom left in FIG. 1). The meshes 28 that remain free between individual threads 20 are substantially rhombic here. As a result, the braiding 18 forms a type of scissor mechanism, that is to say when the corrugated tube 12 and thus the braiding 18 is lengthened (for example stretched in a direction to the left and to the right in FIGS. 1 and 2), the diameter of the braiding 18 also decreases due to the structure of the braiding 18.

Therefore, if a fluid pressure prevailing in the fluid line 10, that is to say in a fluid flow channel 30 formed therein, acts on the corrugated tube 12 such that the corrugated tube 12 is likely to extend, the braiding 18 generates a force on the wall of the corrugated tube 12 in the direction of a diameter reduction of the braiding 18. Due to the fact that the diameter reduction of the braiding 18 counteracts both the fluid pressure in the fluid flow channel 30 of the fluid line 10 and the limited compressibility of the material of the corrugated tube 12, a further lengthening of the fluid line 10 is prevented by the fact that these counteracting forces prevent a further reduction in diameter of the braiding 18.

In order to be able, in this case, to prevent the braiding 18 from allowing a predetermined length change, due to the stretchability of the threads 20 themselves, the modulus of elasticity of the threads 20 should be selected to be as high as possible, wherein it is necessary to ensure, at the same time, that the threads 20 do not become too brittle, such that the threads 20 can be prevented from breaking.

In the embodiment shown, the corrugated tube 12 and braiding 18 are connected to one another at the two longitudinal ends of the fluid line 10, wherein this is shown in FIG. 2 only for the right-hand longitudinal end 32 of the fluid line 10.

The invention claimed is:

1. A high-pressure fluid line, comprising:
   a corrugated tube defining a fluid flow channel an interior of the corrugated tube, wherein a wall of the corrugated tube, in parallel with an extension direction of the fluid flow channel, comprises a sequence of wave peaks and wave troughs; and
   a braiding made of threads, wherein the braiding is applied to an outer periphery of the corrugated tube,
   wherein the braiding bears tightly against the outer periphery of the corrugated tube,
   wherein the braiding has a substantially constant braiding angle over an entirety of the corrugated tube,
   wherein a mesh size of the braiding is smaller in a region of wave troughs than in a region of wave peaks, and
   wherein the high-pressure fluid line is configured such that stretching of the corrugated tube in a longitudinal direction is accompanied by a reduction in diameter of the braiding.

2. The high-pressure fluid line of claim 1, wherein a braiding angle is in a range of 30° to 60°.

3. The high-pressure fluid line of claim 2, wherein the braiding angle is substantially 45°.

4. The high-pressure fluid line of claim 1, wherein the braiding comprises a first group of threads and a second group of threads, wherein the first group of threads and the second group of threads extend in opposite winding directions around the corrugated tube.

5. The high-pressure fluid line of claim 4, wherein each of the first group of threads and the second group of threads is formed as one or more of a monofilament or a multifilament.

6. The high-pressure fluid line of claim 4, wherein each of the first group of threads and the second group of threads comprises one or more of polyethylene terephthalate or aramid.

7. The high-pressure fluid line of claim 4, wherein each of the first group of threads and the second group of threads comprises a modulus of elasticity of at least 3 kN/mm$^2$.

8. The high-pressure fluid line of claim 7, wherein the modulus of elasticity is at least 4.5 kN/mm$^2$.

9. The high-pressure fluid line of claim 1, wherein the high-pressure fluid line further comprises an outer protective layer arranged on an outer side of the corrugated tube.

10. The high-pressure fluid line of claim 9, wherein the outer protective layer connects the braiding to the corrugated tube at least in portions.

11. The high-pressure fluid line of claim 9, wherein the braiding is embedded in the outer protective layer.

12. The high-pressure fluid line of claim 9, wherein the outer protective layer comprises silicone.

13. The high-pressure fluid line of claim 1, wherein the braiding is arranged on the corrugated tube substantially following the sequence of wave peaks and wave troughs.

14. The high-pressure fluid line of claim 1, wherein a profile of the corrugated tube comprises a substantially sinusoidal course.

15. The high-pressure fluid line of claim 1, wherein the corrugated tube is made of a thermoplastic material.

16. The high-pressure fluid line of claim 15, wherein the thermoplastic material comprises polyamide.

17. The high-pressure fluid line of claim 1, wherein a wall of the corrugated tube comprises a multilayered structure comprising two layers.

18. A pipe arrangement for high-pressure applications, comprising:

a high-pressure fluid line, comprising:

a corrugated tube defining a fluid flow channel in an interior of the corrugated tube, wherein a wall of the corrugated tube, in parallel with an extension direction of the fluid flow channel comprises a sequence of wave peaks and wave troughs;

a braiding made of threads, wherein the braiding is applied to an outer periphery of the corrugated tube, wherein the braiding bears tightly against the outer periphery of the corrugated tube, wherein the braiding has a substantially constant braiding angle over an entirety of the corrugated tube wherein a mesh size of the braiding is smaller in a region of wave troughs than in a region of wave peaks, and wherein the high-pressure fluid line is configured such that stretching of the corrugated tube in a longitudinal direction is accompanied by a reduction in diameter of the braiding; and a respective connector at each of the two ends of the high-pressure fluid line, wherein each respective connector is configured to fix a multilayered structure of the high-pressure fluid line to the other in one or more of a force-fitting manner or a form-fitting manner.

* * * * *